US012652167B2

(12) United States Patent
Capkun et al.

(10) Patent No.: US 12,652,167 B2
(45) Date of Patent: Jun. 9, 2026

(54) STORING CRYPTOGRAPHIC KEYS SECURELY

(71) Applicant: THE BLOCKHOUSE TECHNOLOGY LIMITED, Oxford (GB)

(72) Inventors: Srdjan Capkun, Oxford (GB); Mario Matijasevic, Zagreb (HR); Vedran Novoselac, Zagreb (HR)

(73) Assignee: THE BLOCKHOUSE TECHNOLOGY LIMITED, Oxford (GB)

( * ) Notice: Subject to any disclaimer, the term of this patent is extended or adjusted under 35 U.S.C. 154(b) by 50 days.

(21) Appl. No.: 18/683,757

(22) PCT Filed: Aug. 12, 2022

(86) PCT No.: PCT/EP2022/072736
§ 371 (c)(1),
(2) Date: Feb. 14, 2024

(87) PCT Pub. No.: WO2023/020977
PCT Pub. Date: Feb. 23, 2023

(65) Prior Publication Data
US 2024/0356743 A1 Oct. 24, 2024

(30) Foreign Application Priority Data

Aug. 16, 2021 (GB) ..................................... 2111737

(51) Int. Cl.
*H04L 9/08* (2006.01)
(52) U.S. Cl.
CPC .................................. *H04L 9/0861* (2013.01)

(58) Field of Classification Search
None
See application file for complete search history.

(56) References Cited

U.S. PATENT DOCUMENTS

| | | |
|---|---|---|
| 2004/0179686 A1 | 9/2004 | Matsumura et al. |
| 2010/0054470 A1* | 3/2010 | Schneider ............... H04L 9/085 |
| | | 380/255 |

(Continued)

FOREIGN PATENT DOCUMENTS

WO WO-2018202742 A1 * 11/2018 ........... H04L 9/3242

OTHER PUBLICATIONS

International Search Report and Written Opinion for PCT/EP2022/072736, mailed Dec. 5, 2022, 14 pages.

(Continued)

*Primary Examiner* — Benjamin E Lanier
(74) *Attorney, Agent, or Firm* — Klarquist Sparkman, LLP

(57) ABSTRACT

A method for distributed storage of a cryptographic key comprises generating a plurality of key components, wherein each key component is generated by a different respective computing device or enclave. The key components are suitable for processing to generate a cryptographic key that depends on all of the key components. The method comprises processing a first key component in a secret-sharing generation process to generate a plurality of shares, so that the first key component can be reconstructed from any subset of the shares of at least a predetermined threshold size. The method further comprises storing a first share in a first store, and storing a second share in a second store.

16 Claims, 6 Drawing Sheets

(56)                    References Cited

U.S. PATENT DOCUMENTS

| | | |
|---|---|---|
| 2011/0246766 A1 | 10/2011 | Orsini et al. |
| 2016/0012653 A1* | 1/2016 | Soroko .................. G07C 5/008 |
| | | 340/5.61 |
| 2020/0169391 A1 | 5/2020 | Kapp et al. |
| 2020/0389306 A1 | 12/2020 | Dolan et al. |
| 2022/0329410 A1* | 10/2022 | Yeo ....................... H04L 9/0656 |

OTHER PUBLICATIONS

IPO Search Report under Section 17(5) for Great Britain Application No. 2111737.9, dated Feb. 14, 2022, 3 pages.
Anders Dalskov et al., "2FE: Two-Factor Encryption for Cloud Storage," arxiv.org, Cornell University Library, 201 Olin Library Cornell University Ithaca, NY 14853, Oct. 27, 2020 (Oct. 27, 2020), XP081800806, p. 7-p. 9.

* cited by examiner

Initial Generation of Key Pair

Reconstruction of Private Key for Signing

STORING CRYPTOGRAPHIC KEYS SECURELY

CROSS REFERENCE TO RELATED APPLICATIONS

This is the U.S. National Stage of International Application No. PCT/EP2022/072736, filed Aug. 12, 2022, which was published in English under PCT Article 21 (2), which in turn claims the benefit of Great Britain Application No. 2111737.9, filed Aug. 16, 2021.

BACKGROUND OF THE INVENTION

This invention relates to apparatus and methods for storing cryptographic keys securely.

Cryptographic keys can be used in cryptographic algorithms to encrypt and decrypt data, and to sign and authenticate messages. Cryptographic keys can be symmetric, where the same key is used for encrypting and decrypting, or for signing and authentication, or they can be asymmetric, where a key pair comprises a private key and a corresponding public key, with public key being used for encryption or signature verification, and the private key being used for decryption or signature generation.

It is typically important that cryptographic keys (symmetric keys or private asymmetric keys) are stored securely, so that they cannot be discovered and used by unauthorised persons, e.g. to decrypt secret messages or to generate fraudulently cryptographic signatures. It is also typically important that secret keys are not inadvertently lost, e.g. due to hardware failure.

This is particularly evident in cryptocurrency systems, where very large amounts of wealth may be stolen or rendered inaccessible if a user's secret key, intended for signing a cryptocurrency transaction, is stolen or is lost from a data store (e.g. a server) on which it is stored.

One approach to mitigating these risks is the use of a secret-sharing process to split a cryptographic key into a number, k, of distinct shares (i.e. different numerical values), which can be stored separately, e.g. in different secure data stores. The secret-sharing process enables the cryptographic key to be reconstructed from any subset of the shares containing at least a threshold, t, number of shares. Examples of such threshold secret-sharing processes include: Shamir's secret sharing; Blakley's secret sharing; and secret-sharing based on the Chinese remainder theorem. Even if an attacker manages to compromise a device storing one of the cryptographic key shares, the attacker will not be able to reconstruct the key (assuming t>1).

Conversely, if one of the shares is permanently or temporarily lost or unavailable, the cryptographic key can still be reconstructed by legitimate user or users by accessing at least some of the remaining shares (assuming t<k).

While such secret-sharing can provide improved security and resilience, compared with storing the whole cryptographic key in a single data store, it would be desirable to provide even greater security. Thus, embodiments of the present invention seek to provide a more secure approach for storing a cryptographic key.

SUMMARY OF THE INVENTION

From a first aspect, the invention provides a method for distributed storage of a cryptographic key, the method comprising:

generating a plurality of key components, the key components being respective values suitable for processing in a key-assembly process to generate a cryptographic key having a value that depends on all of the plurality of key components;

processing a first key component of the plurality of key components in a secret-sharing generation process to generate a plurality of shares of the first key component, such that the first key component can be reconstructed, using a corresponding secret-sharing reconstruction process, from any subset of the shares of at least a predetermined threshold size, the threshold being less than the number of shares;

storing a first share of the plurality of shares in a first store; and storing a second share of the plurality of shares in a second store.

From a further aspect, the invention provides a system for distributed storage of a cryptographic key, the system comprising a key-component generating apparatus configured to:

generate a plurality of key components, the key components being respective values suitable for processing in a key-assembly process to generate a cryptographic key having a value that depends on all of the plurality of key components;

process a first key component of the plurality of key components in a secret-sharing generation process to generate a plurality of shares of the first key component, such that the first key component can be reconstructed, using a corresponding secret-sharing reconstruction process, from any subset of the shares of at least a predetermined threshold size, the threshold being less than the number of shares;

output a first share of the plurality of shares for storage in a first store; and output a second share of the plurality of shares for storage in a second store.

From further aspects, the invention provides computer software, and a transitory or non-transitory storage medium storing the same, comprising instructions which, when executed on a computing processing system, cause the computing processing system to:

generate a plurality of key components, the key components being respective values suitable for processing in a key-assembly process to generate a cryptographic key having a value that depends on all of the plurality of key components;

process a first key component of the plurality of key components in a secret-sharing generation process to generate a plurality of shares of the first key component, such that the first key component can be reconstructed, using a corresponding secret-sharing reconstruction process, from any subset of the shares of at least a predetermined threshold size, the threshold being less than the number of shares;

output a first share of the plurality of shares for storage in a first store; and output a second share of the plurality of shares for storage in a second store.

Thus it will be seen that, in accordance with embodiments of the invention, a cryptographic key is represented by a number of shares that are shares of respective components of the cryptographic key, rather than being direct shares of the full cryptographic key, and these shares are stored in respective stores. In this way, even if the attacker manages to compromise an above-threshold number of shares, this may not, in general, be sufficient to allow the attacker to construct the cryptographic key, because the attacker may still not be able to reconstruct all of the key components required to generate the cryptographic key.

This can be seen by considering a simple example. Suppose that a cryptographic key depends on 10 key components, each of which is split into 10 shares using a secret-sharing generation process having a threshold, t, for reconstruction of five ($t=5$). Even if an attacker manages to compromise 50 of the 100 shares, the cryptographic key would remain secure unless the attacker had exceptionally managed to compromise 5 shares from each of the 10 key components. If, more plausibly, the attacker had compromised, say, 8 shares from each of 5 key components, and 2 shares from each of the remaining 5 key components, the attacker would not have enough information to reconstruct these remaining 5 key components, and so could not generate the cryptographic key, as the key depends on all 10 key components. By contrast, if the cryptographic key had naïvely been split into 100 shares by applying a secret-sharing process, with a threshold $t=50$, directly to the full cryptographic key, then compromising any subset of 50 of the 100 shares would enable the attacker to determine the cryptographic key.

The plurality of key components are preferably generated independently of each other. In preferred embodiments, each key component is generated by a different respective computing device or enclave.

It will be appreciated that the approaches disclosed herein do not require a cryptographic key to be centrally generated and then split into multiple components, but can instead enable all the data representing the cryptographic key (i.e. the key components and corresponding shares) to be generated in a distributed manner. This can help secure the key generation and storage process from attack by not requiring the whole cryptographic key to be held at any single location during the process of generating the key components and shares.

The secret-sharing generation process may comprise Shamir's secret sharing, or Blakley's secret sharing, or may be based on the Chinese remainder theorem, or any other appropriate algorithm. In a preferred set of embodiments, the first key component is processed using Shamir's secret-sharing to generate the plurality of shares.

The first share is preferably not stored in the second store, and the second share is preferably not stored in the first store. This can help to ensure that compromise of either store is not sufficient to allow an attacker to determine the first key component.

There may be any number of shares of the first key component—e.g. 5, 10, 50, 100 or more. The threshold may have any value—e.g. 3, 5, 10, 50 or more. The threshold is preferably greater than one. Each of the plurality of shares of the first key component may be stored, or output for storage, in a respective store of a plurality of stores. In some embodiments, no two shares of the first key component are stored, or output for storage, in the same store as each other.

One or more, or each, further key component of the plurality of key components may be processed in a respective secret-sharing generation process, to generate a respective plurality of shares of the further key component. The same secret-sharing generation process may be applied to each key component (albeit optionally using different instances of the process, e.g. executing on different processors). The secret-sharing generation process may be such that each key component can be reconstructed from any subset of the shares of the key component that contains at least a respective predetermined threshold number of shares. At least first and second, or all shares, shares of each such further key component may be stored in different stores from each other.

The system may comprise the first and second stores. It may comprise a plurality of stores. Each store may be provided by a storage medium, such as a magnetic or solid-state memory. It may be provided by a respective computing device.

In some embodiments, at least two of the key stores are provided by (i.e. implemented on) respective computing system having different respective processor architectures and/or computer architectures (e.g. different hardware and/or operating systems). Each processor or computing system may be manufactured by a different respective manufacturer, such as Intel Corporation™, Arm Limited™ and/or may be provided or operated by a different respective operator, e.g. Amazon Web Services (AWS)™, etc. This can help to provide more robustness and protection from attack, such as side-channel attacks, as the likelihood of a single type of attack being successful against every key store can be significantly reduced, owing to the variations in processor architectures.

Preferably the key-component generating apparatus is configured to generate the key components randomly (i.e. using a pseudo-random or true-random process). Each key component may be a random number. In some embodiments, the key components may all have a same bit length, which may be equal to the bit length of the desired cryptographic key, and each key component may be a true- or pseudo-random value of said bit length. Preferably the key-component generating apparatus is configured to use a random number generator to generate the key components. Each key-component generating device or enclave (of the key-component generating apparatus) may be configured to use a random number generator to generate the respective key components. Each key-component generating device or enclave preferably comprises or is configured to access a different respective random number generator, although a shared random number generator might be used in some embodiments. The or each random number generator may be implemented in hardware or software.

By generating the key components randomly—rather than deriving them from an already-existing cryptographic key, for example—the key components can be generated so as to provide a cryptographically strong key yet without requiring the cryptographic key to be constructed before it is required for use in a cryptographic operation.

The key-component generating apparatus may comprise a plurality of key-component generating devices, each configured to generate a respective key component of the plurality of key components. Each key-component generating device may be provided by respective computing system having different respective processor architectures and/or computer architectures—e.g. having similar features to any those set out above in respect of the key stores. Preferably, each key component is generated independently. Generating the key components preferably does not require any knowledge of the assembled cryptographic key. This contrasts with the secret-sharing generation process used to generate the shares of each key component, in which the key components are first generated and then disassembled by actively splitting a key component into shares. Generating each key component independently, without knowledge of any other key component or of the final cryptographic key, provides security to the key generation process.

Each key-component generating device may be configured to process the respective key component in a respective secret-sharing generation process to generate a plurality of shares of the respective key component. Each may be configured to output two or more shares of the plurality of shares to respective stores.

Storing at least some of the shares of the same and/or different key components in different respective stores from each other can provide a high level of security. It can also provide robustness against the temporary or permanent unavailability or loss of data from a particular store (e.g. due to hardware failure).

The use of key components, as described, can provide yet further security and/or flexibility by enabling the shares of the different key components to be distributed between different storing entities and/or geographical locations, e.g. according to a desired policy. It may, for example, enable the shares of different key components to be stored on different corporate networks, so that even if a whole corporate network were to be compromised, only one key component would be compromised, and not the whole cryptographic key.

Although it is not required for the cryptographic key to be generated during the method for distributed storage of a cryptographic key (i.e. the key-assembly process need not necessarily be performed), in some preferred embodiments the cryptographic key is generated as part of the method. This may, for example, be particularly useful when the cryptographic key is a private key of an asymmetric key pair, as it may be desirable to generate the corresponding public key within the same method. Thus, in some embodiments, the method further comprises processing the plurality of key components in a key-assembly process to generate the cryptographic key. As explained above, preferably the cryptographic key is only ever calculated (i.e. for the first time) after all the key components have been generated.

However, at least in some preferred embodiments, the cryptographic key is generated by reconstructing the key components from respective sets of key shares, rather than by directly processing the key components generated as part of the distributed storage process. This may provide security benefits in some implementations, by avoiding a need to communicate the key components between different processing modules. The method may comprise, for each of one or more key components of the plurality of key components, processing a respective set of shares of at least threshold size in a respective secret-sharing reconstruction process to reconstruct the respective key component. This may be done to generate the cryptographic key.

The system may further comprise a key-assembly apparatus configured to:

receive, from the first store, the first share of the first key component;

receive, from the second store, the second share of the first key component;

process a set of shares of the first key component, including at least the first and second shares, in a secret-sharing reconstruction process to reconstruct the first key component;

receive or reconstruct each further key component of the plurality of key components; and process the plurality of key components in a key-assembly process to generate the cryptographic key.

The key-assembly apparatus may be configured to receive a respective set of shares of each of one or more, or every, further key component. It may process each received set of shares in a respective secret-sharing reconstruction process to reconstruct the respective further key component.

The key-assembly process may comprise any process for determining an output value from a plurality of component values, such that the output value depends at least partly on each of the component values. The key-assembly process may be such that changing any single bit of any of the key components will result in a change of output value. Preferably the key-assembly process is such that all of the plurality of key components are required to generate the cryptographic key (i.e. not only a subset of the key components). Preferably the key-assembly process does not use (i.e. involve) secret-sharing reconstruction. Preferably the key-assembly process comprises processing all of the key components corresponding to the cryptographic key.

The key-assembly process preferably comprises processing a set of key components which is preferably all of the plurality of key components. Preferably the key-assembly process is such that including a further key component in the set of key components processed would change the output of the key-assembly process. The key-assembly process may be such that the cryptographic key is influenced by every key component of the set of key components, irrespective of the number of key components forming the set of key components. Preferably the key-components forming the set of key components are the only key components that can be used to assemble the cryptographic key. In some embodiments, the key-assembly process is such that it generates a cryptographic key that is unique to the set of key components processed.

In some embodiments, the assembly process may comprise concatenating the plurality of component values. However, in a preferred set of the embodiments, the key-assembly process comprises, or consists of, calculating a bit-wise XOR of the plurality of key components. The key components may all have a common bit-length, which may be equal to a bit-length of the cryptographic key (e.g. 256 bits). The use of XOR provides computationally efficiency while ensuring that the cryptographic key depends fully on every bit of each key component. Furthermore, the use of XOR also allows a cryptographic key to be generated based on key components that can be independently generated, rather than the key components being generated from the cryptographic key itself. It thus supports independent, distributed generation of the key components.

The cryptographic key may be a symmetric key or a private asymmetric key. It may be an elliptic-curve key. It may be suitable for use decrypting data and/or for generating a cryptographic signature. The system may be configured, when the cryptographic key is a private asymmetric key, to generate a public asymmetric key corresponding to the cryptographic key.

Reconstruction of the cryptographic key may be performed separately—e.g. later in time—from the initial generation of the key shares. It may be performed on multiple later occasions—preferably every time the cryptographic key is required for performing a cryptographic operation since, in preferred embodiments, the cryptographic key is not stored in reconstructed form in permanent memory anywhere on the system, but only as key shares distributed across a plurality of stores.

Thus, from a further aspect, the invention provides a method for reconstructing a cryptographic key, the method comprising:

receiving, from a first store, a first share of a first key component of a cryptographic key;

receiving, from a second store, a second share of the first key component;

processing a set of shares of the first key component, including at least the first and second shares, in a secret-sharing reconstruction process to reconstruct the first key component;

receiving or reconstructing one or more further key components of the cryptographic key; and processing the first key component and the one or more further key components in a key-assembly process to generate the cryptographic key.

From a further aspect, the invention provides a system for reconstructing a cryptographic key, the system comprising a key-assembly apparatus configured to:

receive, from a first store, a first share of a first key component of a cryptographic key;

receive, from a second store, a second share of the first key component;

process a set of shares of the first key component, including at least the first and second shares, in a secret-sharing reconstruction process to reconstruct the first key component;

receive or reconstruct one or more further key components of the cryptographic key; and process the first key component and the one or more further key components in a key-assembly process to generate the cryptographic key.

From further aspects, the invention provides computer software, and a transitory or non-transitory storage medium storing the same, comprising instructions which, when executed on a computing processing system, cause the computing processing system to:

receive, from a first store, a first share of a first key component of a cryptographic key;

receive, from a second store, a second share of the first key component;

process a set of shares of the first key component, including at least the first and second shares, in a secret-sharing reconstruction process to reconstruct the first key component;

receive or reconstruct one or more further key components of the cryptographic key; and process the first key component and the one or more further key components in a key-assembly process to generate the cryptographic key.

Features of any of the preceding aspects or embodiments may be features of embodiments of these aspects also. In particular, the system for reconstructing the cryptographic key may also be a system for the distributed storage of the cryptographic key, as disclosed herein. It may comprise a key-component generating apparatus as well as a key-assembly apparatus.

The same secret-sharing generation process is preferably used for sharing each key component and the same secret-sharing reconstruction process is preferably used for reconstructing each key component. The same number of shares and the same threshold could be used for every key component. However, in some embodiments, the number of shares may differ between at least two of the key components. The threshold may differ for at least two of the key components. The number of shares and/or the threshold for each key component may be configurable. The system may comprise an input for receiving parameter data representative of a respective number of shares to generate for each key component and/or representative of a predetermined threshold for the respective secret-sharing generation process used to process each key component. This can provide greater flexibility in determining how shares are distributed, and what minimum numbers of shares are required to be involved, potentially from different entities, for reconstructing the key—e.g. it can facilitate complex policies on how many signatories are needed, and from which organisations, to sign a particular transaction, such as a cryptocurrency transaction.

The key-assembly apparatus may be further configured to use the cryptographic key to perform a cryptographic operation, such as a cipher operation or a signature operation. In a preferred set of embodiments, the key-assembly apparatus is configured to use the key in an elliptic-curve digital signature algorithm (ECDSA). It may be configured to use the key to sign a cryptocurrency transaction.

The key-assembly apparatus may be configured to generate the cryptographic key in response to receiving an instruction to perform a cryptographic operation using the cryptographic key. It is preferably configured to erase the cryptographic key from a memory of the apparatus in response to finishing the cryptographic operation. It preferably erases the key immediately upon finishing the operation. This reduces the risk of exposure of the key to an adversary.

In preferred embodiments, the system comprises a computing device (e.g. a server or workstation) comprising memory and a processor configured to provide a trusted execution environment (TEE) for securely decrypting and executing software instructions that are stored, encrypted, in an enclave of the device. The TEE may be provided by an Intel processor that supports Software Guard Extensions (SGX), or an Arm processor that supports TrustZone, or any other processor configured to provide a TEE. The enclave may be stored in the memory of the device. The enclave may be specific to a cryptographic key, or it may be shared by multiple cryptographic keys. The system may comprise a plurality of such devices, which may be communicatively coupled by a network. They may be configured for communicating with each other over encrypted and authenticated channels.

Each key component may be generated in a different respective enclave of the system (referred to herein as key-component generating enclaves). The secret-sharing generation process is preferably performed on a key component within the same enclave. The key component is preferably erased from the enclave in response to finishing the secret-sharing generation process for the key component.

Each store may be provided by a different respective enclave of the system (referred to herein as storage enclaves).

The system (e.g. key-assembly apparatus) may be configured to reconstruct each key component and to process the key components in a key-assembly process to generate the cryptographic key within an enclave of the key-assembly apparatus (referred to herein as a key-assembly enclave). It may perform a cryptographic operation using the cryptographic key within the same enclave. It may be configured so that the cryptographic key never leaves the enclave. It preferably erases the key components and the cryptographic key from the enclave in response to finishing the cryptographic operation.

Each of these enclaves may be a different enclave provided on a single computing device, but all or at least some of the enclaves are preferably provided in the memories of different respective devices. These devices may be geographically distributed—e.g. being in different buildings, towns, localities or countries.

Distributed generation of the key components means that even if an attacker compromises one device involved in the key generation process, this won't compromise the whole key. This is because the devices involved in the key generation process need not store the fully-formed key in order to generate the key components. By contrast, if using a naïve approach of splitting a key into shares directly, on one device, if an attacker compromised the device that generates the key shares, the attacker may be able to compromise the key from the outset.

The key-assembly apparatus may provide a plurality of key-assembly enclaves, e.g. on different devices. Although only one enclave is preferably used for any particular key generation operation, having a choice of multiple enclaves or devices can enable efficient load-balancing as well as resilience in case of hardware failure.

The system may comprise an interface device for providing an interface for clients. The interface may enable a client to instruct the system to generate a new cryptographic key (or key pair), or to reconstruct and use a stored cryptographic key in a cryptographic operation. The system may be configured to authenticate a client and/or received instruction before implementing the instruction. The system may provide attestation information to the client—it may attest each enclave that is involved in implementing a received instruction.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
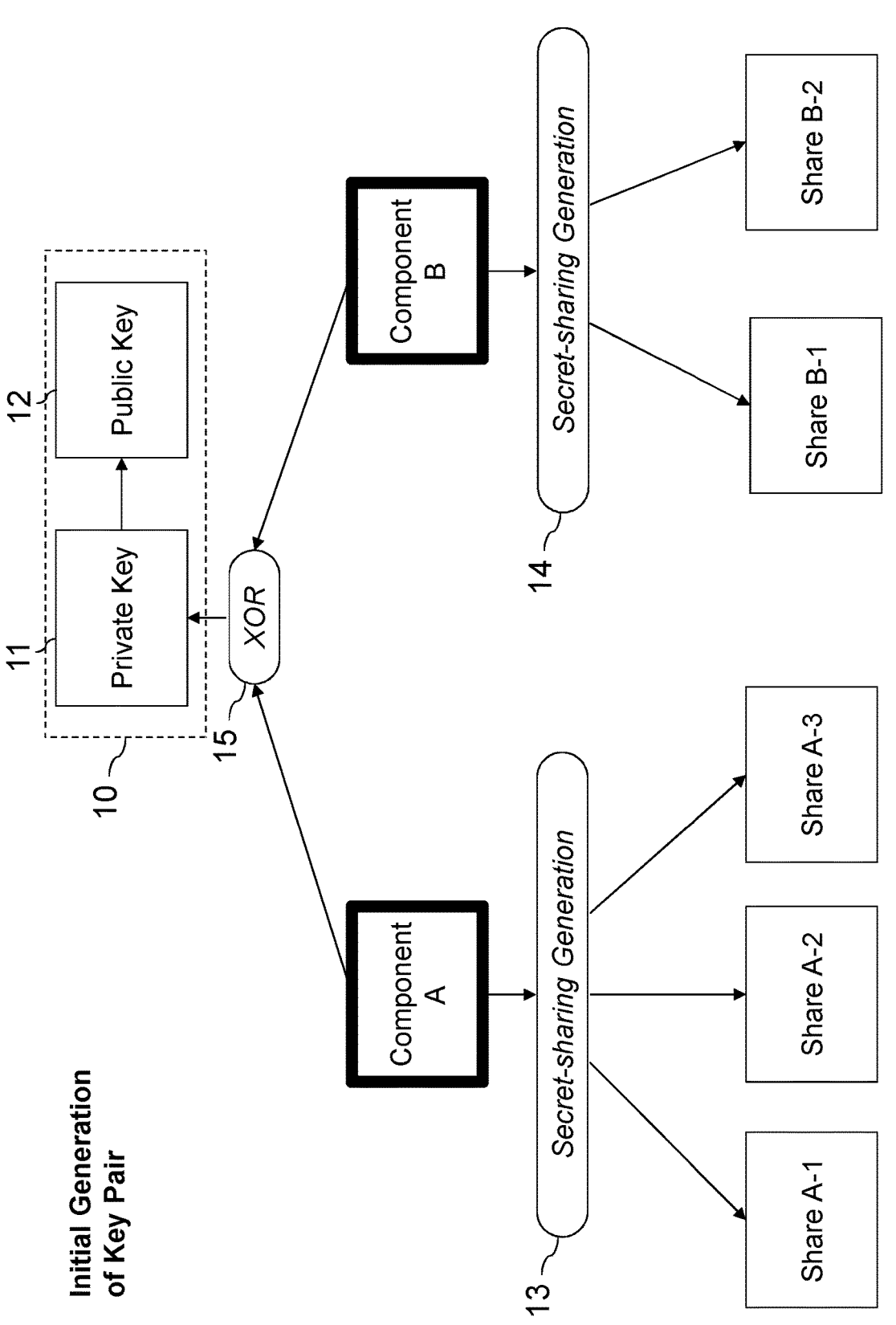
FIG. 1 is a schematic diagram illustrating a process, embodying the invention, for initially generating and securely storing a cryptographic private key.
Figure 2:
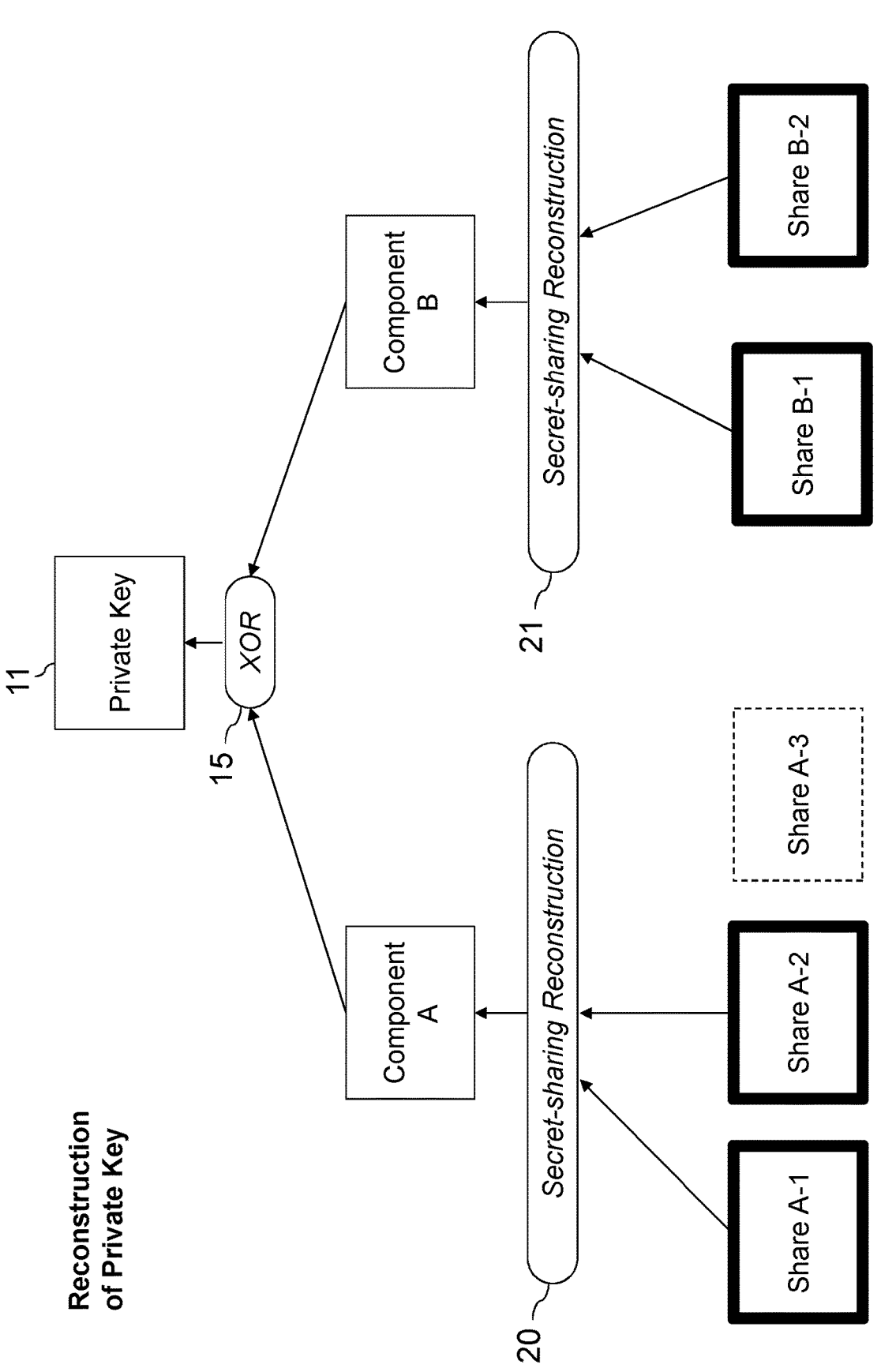
FIG. 2 is a schematic diagram illustrating a process, embodying the invention, for reconstructing the securely-stored cryptographic private key.

FIG. 1 shows an exemplary set of processes and parameter values involved in an example method for generating an asymmetric elliptic curve cryptographic (ECC) key pair 10, formed of a private key 11 and a public key 12, for use in an elliptic-curve digital signature algorithm (ECDSA), and for securely storing the private key 11 in a distributed manner. FIG. 2 shows a complementary set of processes and parameter values involved in an example method for reconstructing the private key 11 of the asymmetric cryptographic key pair 10. FIGS. 1 and 2 focus on the mathematics of the processes. FIGS. 3-6 provide more details of exemplary software and hardware suitable for implementing these and similar processes.

As shown in FIG. 1, generating the private key 11 starts with generating two independent random values, Component A and Component B, referred to herein as key components. Each has a bit-length equal to the desired length of the private key 11 (e.g. 256 bits). Component A is, in this example, input to a first Shamir secret-sharing generation process 13 to generate three shares A-1, A-2, A-3, with a threshold of two shares for reconstructing Component A (i.e. k=3, t=2). Component B is, in this example, input to a second Shamir secret-sharing generation process 14 to generate two shares B-1, B-2, with a threshold of two shares for reconstructing Component B (i.e. k=2, t=2). This is a deliberately simplistic implementation, to illustrate the principle; in practice, more random key components than two may be generated (e.g. five, ten, fifty or more), and a larger number of shares may be generated per component (e.g. five, ten, fifty or more), with a higher threshold value for the secret-sharing process. The thresholds will typically lie strictly between one and the number of shares (i.e. 1<t<k). The thresholds may all be the same, but could potentially be set differently for different key components.

Additionally, the key components, Components A & B, are both input to an XOR function 15 which calculates their bitwise XOR. Although FIG. 1 shows the exact same key components being input to the XOR function 15, in actual implementations of the system, the key component values that are input to the XOR function 15 may instead be calculated from the respective shares, as shown in FIG. 2, even in the initial key generation process. The values are the same mathematically, and the result is the same, but there can be security advantages to ensuring that the key-component values only ever flow in one direction through the system. If further key components are generated, these would also input to the XOR function 15, along with Components A & B. The XOR function 15 assembles the key components into a value that forms the private key 11 for an elliptic curve. A corresponding public key 12 can be calculated from the private key 11 using conventional processes (e.g. through point addition on an elliptic curve). It will be appreciated that this process can be adapted for generating other types of cryptographic keys, such as symmetric AES keys (where the key may again directly equal the XOR'd output of key components of suitable length), or other asymmetric key pairs such as an RSA key pair (where a key pair may be derived from the value output from the XOR function 15, i.e. using the XOR output as a source of entropy for a key generation process).

The public key 12 may be stored in memory and may be shared publicly. The key components are preferable destroyed after the key pair 10 has first been generated—i.e. not stored permanently in memory. The private key 11 is preferably also erased immediately after the public key 12 has been generated (although it could optionally be used to perform one or more cryptographic operations, such as a signature generation, before being erased from memory as soon as this is done).

FIG. 2 shows how the private key 11 can still be reconstructed from suitable combinations of the shares, A-1, A-2, A-3, B-1, B-2, even without having access to the key components directly. For the purposes of illustration, the example in FIG. 2 assumes only shares A-1, A-2, B-1 and B-2 are available. Share A-3 may have been lost permanently, or may be temporarily inaccessible (e.g. due to hardware or human unavailability).

The two shares A-1, A-2 are input to a first Shamir secret-sharing reconstruction process 20 to regenerate the value Component A. This is possible because the threshold of the corresponding first Shamir secret-sharing generation process 13 was set at two (i.e. t=2). The two shares B-1, B-2 are similarly input to a second Shamir secret-sharing reconstruction process 21 to regenerate the value Component B. The two key components, Components A & B, are input to an XOR function 15 which calculates their bitwise XOR. If further key components were generated in the initial key-pair generation process, shown in FIG. 1, these would also need to be input to the XOR function 15, along with Components A & B, in order to correctly reconstruct the private key 11. The XOR function 15 outputs the value of the private key 11 (or a value from which the private key can be derived, if a key derivation process was used initially).

The private key 11 can then be used to perform one or more cryptographic operations, such as decrypting data or signing a message, but is then preferably deleted, to minimize any risk of exposure.

Figure 3:
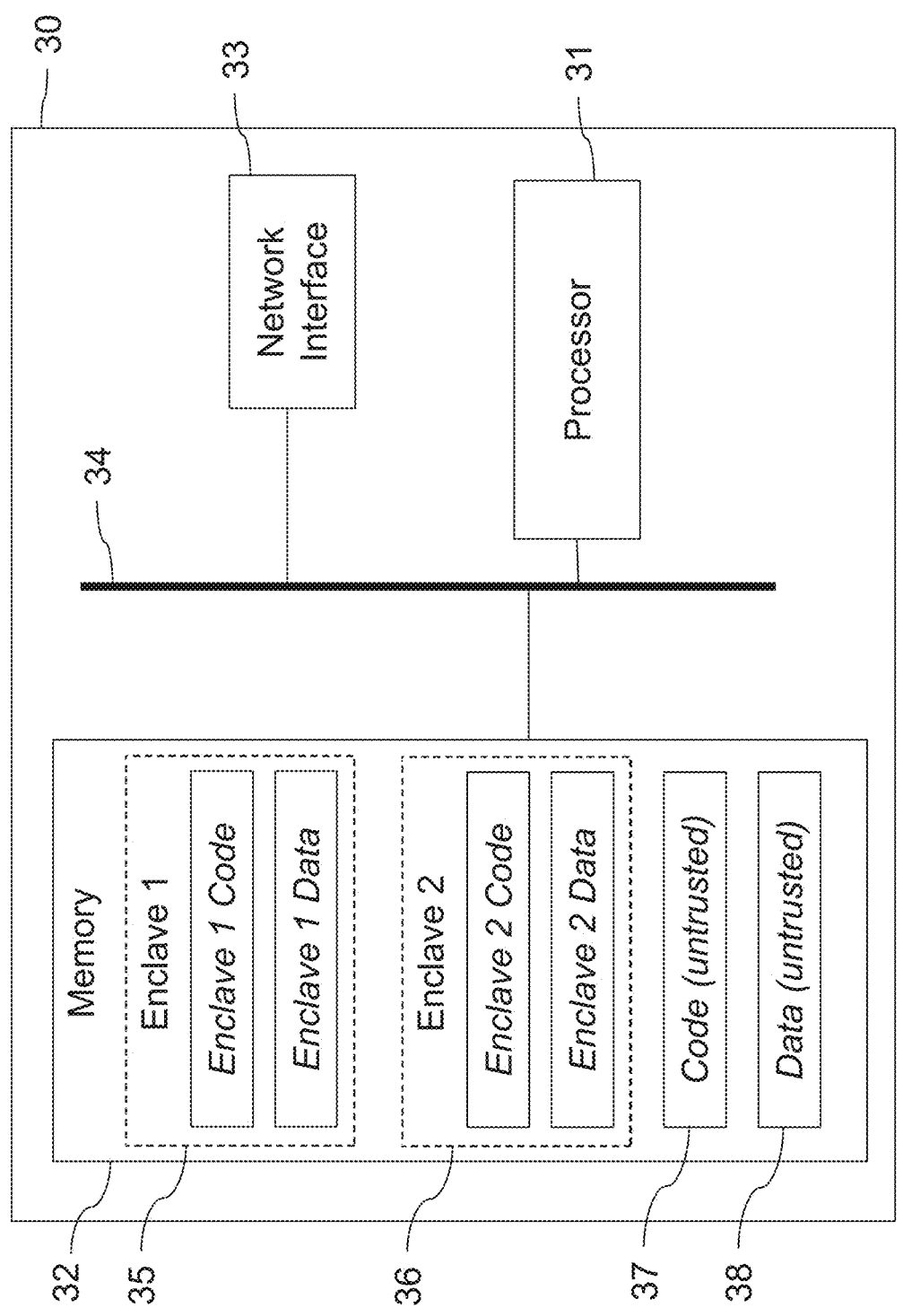
FIG. 3 is a schematic diagram of a computing apparatus for use in embodiments of the invention.

FIG. 3 shows an exemplary computing device 30 on which some or all steps of a method embodying the invention may be implemented. The device 30 may be a server (e.g. a computer located in a server farm). It has a processor 31 which is connected to a memory 32 (e.g. DRAM) and to a network interface 33 by bus system 34. The processor 31 supports a trusted execution environment (TEE). It may implement Intel Software Guard Extensions (SGX) or Arm TrustZone. In addition to supporting conventional untrusted software code 37, and associated data 38, stored in the memory 32, the processor 31 also has hardware mechanisms to support a secure boot process, remote attestation, and for secure execution of code stored encrypted in one or more enclaves 35, 36 within the memory 32. Each enclave 35, 36 is a region of memory 32 storing encrypted code and associated encrypted data, which travels over the bus 34 in encrypted form, and is only ever decrypted within the processor 31. The integrity of the data and software in an enclave can be verified at boot time, e.g. using public-key-infrastructure (PKI) mechanisms, and the TEE can protect the code and data of each enclave 35, 36 from malicious or inadvertent compromise or attack.

In some embodiments, a system embodying the invention may comprise a plurality of similar such devices 30, communicatively connected by network connections (e.g. over the Internet). Communications between the devices are preferably encrypted and authenticated—e.g. using Transport Layer Security (TLS).

Figure 4:
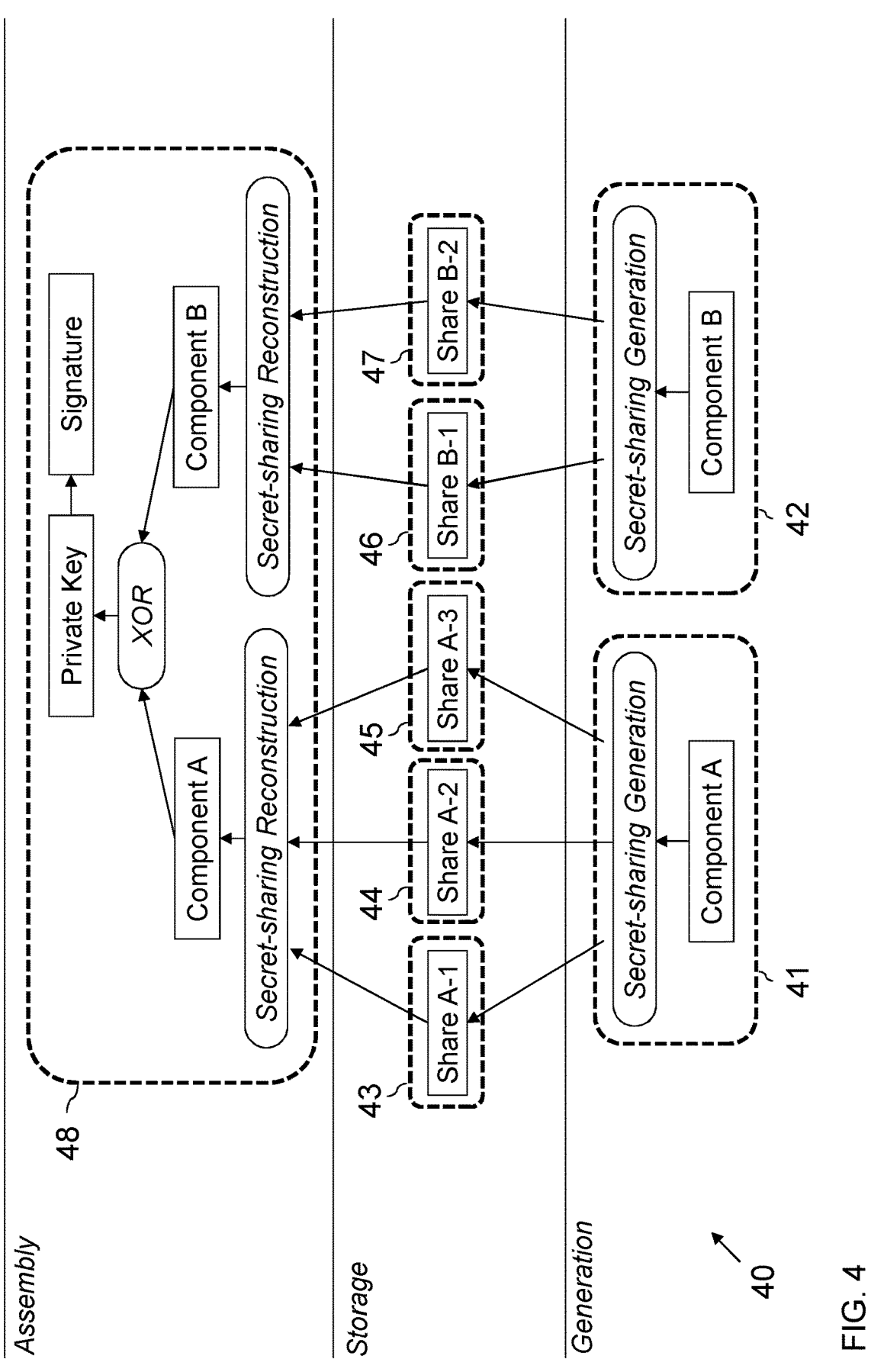
FIG. 4 is a schematic diagram of a computer system, embodying the invention, for implementing these processes.

FIG. 4 shows a computing system 40 for securely storing cryptographic keys on behalf of users (i.e. for providing a secure vault for keys). It is configured and programmed to implement an initial key-pair generation method such as that described with reference to FIG. 1 (albeit incorporating secret-sharing reconstruction even in the initial key-pair generation), and also to implement signature generation involving a key reconstruction method such as that described with reference to FIG. 2.

The computing system 40 has a Generation layer, a Storage layer and an Assembly layer. Each layer contains code executing in a respective set of one or more different enclaves. The example here is relatively simplistic, but the number of enclaves available and/or used in each layer in practice may vary depending between implementations. Each enclave may be hosted on a different computing device 30 (preferably each having different architectures), or some of them may be hosted on the same device 30 as each other, albeit isolated from each other cryptographically. A wider geographical distribution can help to provide robustness against hardware failure and network unavailability, as well as potentially providing greater protection from an attacker. Communication between the enclaves is encrypted using TLS, and the enclaves are all mutually authenticated and mutually attested.

The Generation layer in this example contains a first key-component generating enclave 41 and a second key-component generating enclave 42. Each of the key-component generating enclaves 41, 42 contains code for generating random key components (preferably using a hardware random number generator) of a bit-length corresponding to the desired private key. The key components can thus be generated independently of each other—e.g. as a set of independent random values of the desired bit-length. Each of the key-component generating enclaves 41, 42 also contains code for generating shares of a respective generated key component, e.g. using Shamir's secret-sharing generation algorithm. The enclaves 41, 42 are configured to output the shares to respective storage enclaves 43-47, one or more of which may be hosted on the same physical device 30 as one of the key-component generating enclaves 41, 42, or which may be on different devices.

The Storage layer contains a number of storage enclaves 43-47, each of which contains code for receiving a share from the Generation layer, for storing it securely in the encrypted memory of the enclave 43-47, and for sending the share to an assembly enclave 48 when required.

The Assembly layer of FIG. 4 contains a single assembly enclave 48, but could contain multiple similar enclaves. The assembly enclave 48 contains code for receiving shares corresponding to a particular private key from the Storage layer, and for generating each of the key component values associated with the private key from respective subsets of the received shares, using a secret-sharing reconstruction algorithm. It then assembles the private key by bitwise XOR'ing all of the key components together. In this example, it further comprises code for using the private key to generate a cryptographic signature of a message.

As soon as the signature has been used, the assembly enclave 48 securely erases the received key shares, the key components, and the private key, from its memory. This provides additional protection against attack, even beyond the protection already provided keeping all these values within the encrypted enclave 48. Also, the assembly enclave 48 is coded without any mechanism for outputting key components or private keys. It may, for example, only be capable of outputting insensitive data such as public keys and generated signatures (and possibly decrypted plaintext, which is generally less sensitive than a private key itself).

The Generation layer is involved only the first time a new key is generated. Thereafter, only the Storage and Assembly layers are involved in the subsequent reconstruction of a private key each time it is required for use (e.g. each time a signature needs to be generated).

Each enclave 43-47 in the Storage layer may store shares for multiple different private keys, but preferably stores only a single share for any one private key, so as to provide greater robustness against attack and greater resilience against device failure.

Each enclave 48 in the Assembly layer can reconstruct any private key and use it to generate a signature, so long as it receives the required threshold number of shares for each of the key components. This allows for efficient load balancing between different enclaves in the Assembly layer when reconstructing a private key, e.g. based on network delays and/or current processor load.

Figure 5:
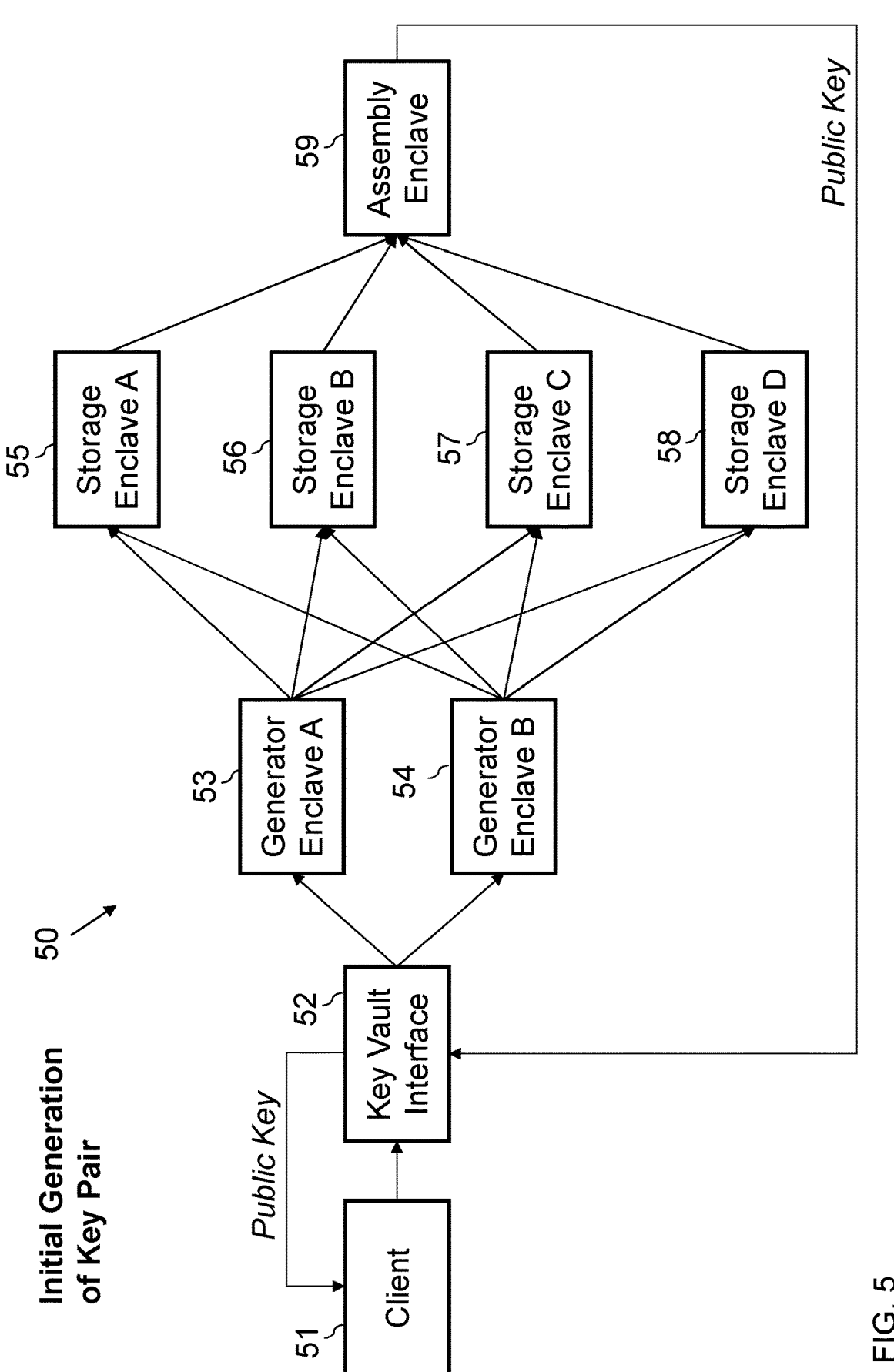
FIG. 5 is a schematic diagram of a further computer system, embodying the invention, showing a flow of commands and data when initially generating and securely storing a cryptographic key.

FIG. 5 shows another key vault system 50, similar to the system 40 of FIG. 4, being used for the initial generation of a new key pair.

In this embodiment, the system 50 includes a key-vault interface device 52 that provides an external interface to the system 50. It also coordinates the actions of the various devices and enclaves 53-59 of the system 50. In particular, it acts as a trust aggregator, to provide an entry point for a caller of key vault services, and to orchestrate flow of encrypted messages between the enclaves 53-59 inside the key vault system 50 during the key generation and signing processes. However, notably, the system 50 is designed so that the confidentiality of the keys and the integrity of the key generation and signing processes do not depend on the integrity of the key-vault interface device 52. The key-vault interface 52 may be implemented by a single or distributed computing apparatus, such as on one or more networked servers.

The system 50 is here shown being instructed by a client device 51 to generate a new key-pair for a user (who could be an individual or an organisation). The client device 51 could for instance be a smart phone of an individual, or it could be a cryptocurrency exchange system acting on behalf of a user, or it could be any other system.

The system 50 provides redundancy and replication for cryptographic keys so as to minimize a single point of failure. As above, the key is generated in a distributed manner, being composed of several key components, each key component being split into key shares using Shamir's secret-sharing method. The key is not exposed during key generation and is resistant against compromise of several enclaves 55-58 storing key shares. Shares are combined into key components, and key components into a key, inside the assembly enclave 59, but only when needed to perform a single cryptographic operation.

As indicated by the arrows in FIG. 5, the communication of data between the key-component generating enclaves 53, 54 and the assembly enclave 59 flows only in one direction, away from the key-component generating enclaves 53, 54 towards the assembly enclave 59. This feature can help to provide greater security against attack.

The system 50 may be further hardened in some embodiments by implementing the functionality of the assembly enclave 59 on a single-purpose tamper-resistance hardware device (HSM), rather than a general-purpose TEE device 30.

As shown in FIG. 5, the client 51 requests the generation of a new key pair on behalf of a user. The instruction to the interface device 52 is TLS-encrypted, which allows the interface device 52 to ensure the freshness of the request (e.g. to block replay attacks). The interface device 52 communicates with a set of key-generation enclaves 53, 54, instructing them to generate respective key components and Shamir shares, and to send the Shamir shares to respective storage enclaves 55-58. Which enclave or enclaves 55-58 receive and store a copy of each share may be determined by a user-specific policy or a system-wide policy, or on a case-by-case basis. More generally, the quantity of key shares and their assignment to particular storage enclaves may depend on the estimated risks and policy and may differ for different keys and for different users of the system 50.

The storage enclaves 55-58 store the received shares in encrypted memory, e.g. using a respective sealing key unique to the enclave 55-58. They may generate further encrypted copies for backup storage—e.g., when the storage enclaves 55-58 receive the key shares, each enclave 55-58 will encrypt its shares with the public key of its own backup storage.

The interface device 52 also instructs the storage enclaves 55-58 to send their respective shares to an assembly enclave 59; if multiple assembly enclaves are available, it may select which one to use based on network proximity or load-balancing criteria. The assembly enclave 59 groups the Shamir shares and reconstructs the respective key components, which it then bitwise XOR's to generate a private key and a corresponding public key, which may be done as already described above. The assembly enclave 59 outputs the public key (but not the private key) to the interface device 52, which may send it to the client 51 and/or other devices as appropriate.

The assembly enclave 59 may also output additional data about the generated key in the form of a key-description data structure. This structure may contain data such as identities of storage enclaves 55-58; details of the mapping from key shares to key components; secret-sharing threshold values. The data may be packeted in structure and signed by the assembly enclave 59. With the data from the key-description structure, the interface device 52 and/or client 51 is able to verify the key generation flow and attest all the participating enclaves.

This approach of using both XOR and secret-sharing to implement a key vault in a distributed manner across multiple enclaves provides a high degree of robustness against device failure and resilience to attack. Because key components are generated separately, each key-component generating enclave 53, 54 that creates a key component is never aware of the full key, so even if one key-component generating enclave 53, 54 were to be compromised such that an attacker learnt one of the key components, the attacker could still not reconstruct the private key.

In some embodiments, the system supports the dynamic refreshing of the shares that make up a particular key component. This can be done by recreating the key component in a key-component generating enclave 53, 54 or by any distributed mechanism supported by the key sharing algorithm.

Figure 6:
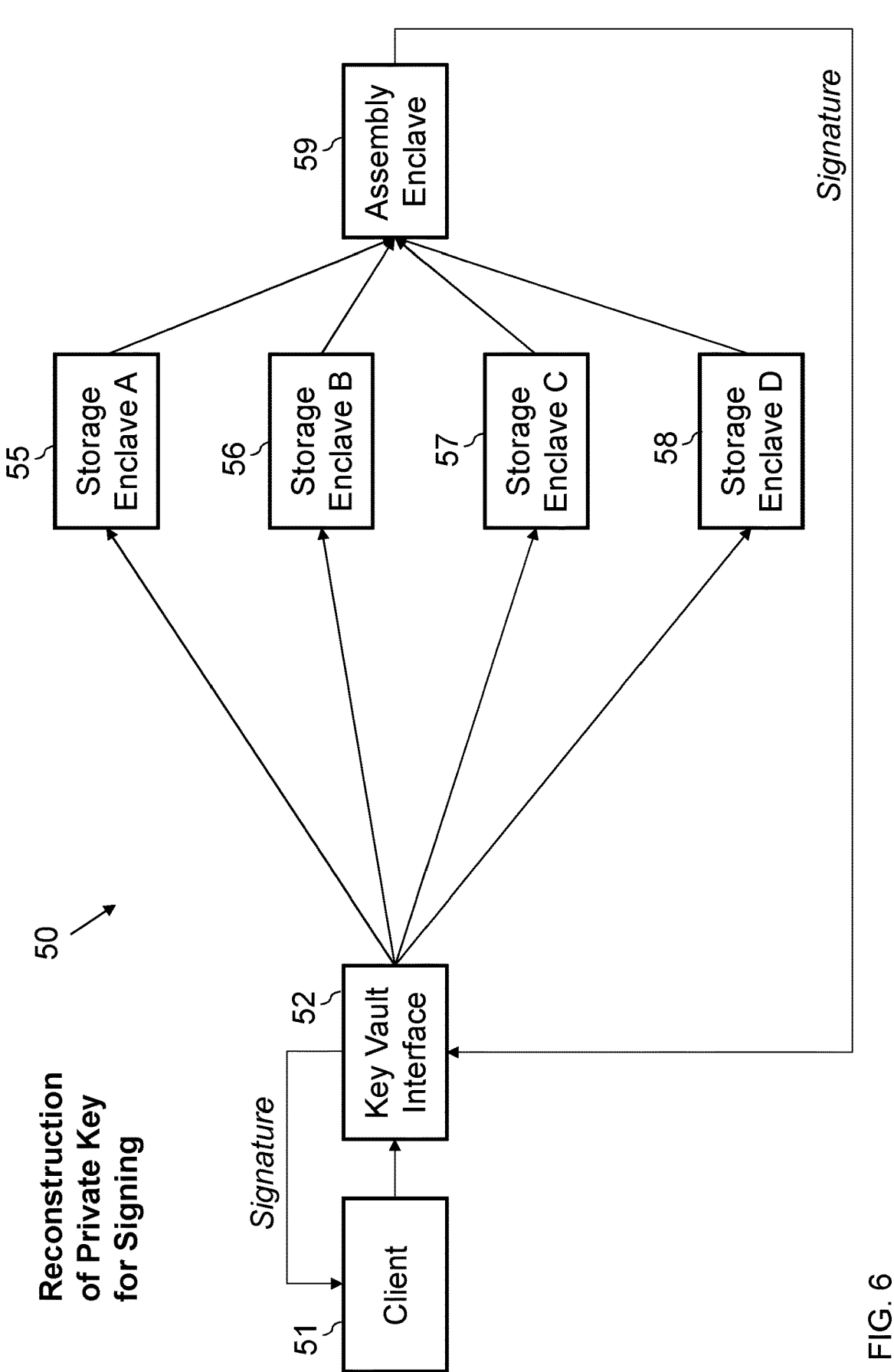
FIG. 6 is a schematic diagram of this further computer system, showing a flow of commands and data when reconstructing the cryptographic key and using it to generate a cryptographic signature.

FIG. 6 shows the key vault system 50 being used at a later time to cryptographically sign data, such as cryptocurrency (e.g. Bitcoin) transaction. The key-generation enclaves 53, 54 are not involved in this process.

The client 51 instructs the key-vault interface device 52 to sign some data (e.g. a particular cryptocurrency transaction) with a particular private signature key. The interface device 52 checks the freshness of the request. However, the client 51 is responsible for ensuring the same data (e.g. cryptocurrency transaction) is not signed twice, since the key vault system 50 does not maintain state between transactions. The interface device 52 sends messages to the storage enclaves 55-58, instructing them to output their respective shares for the associated key to a specific assembly enclave 59. This may be done such that the output key share is bound to the transaction that it will be used to sign—i.e. the interface device 52 may cause each storage enclave 55-58 to send to the assembly enclave 59 an encrypted and authenticated blob that includes a key share and an identifier of the data (e.g. transaction) that needs to be signed with the key associated with the output key share. In some embodiments, each storage enclave 55-58 can independently verify instructions from the interface device 52 and release a key share to the assembly enclave 59 only when satisfied that an instruction originates from the interface device 52, or from an authenticated and authorised client device 52 or user of the client device 52.

Note that some of the enclaves 55-58 may be unavailable (e.g. off-line, due to hardware failure, network outage, data corruption, etc.), but so long as a sufficiently-large subsets of shares of each key component are received by the assembly enclave 59, the private key can still be reconstructed, as already explained.

The assembly enclave 59 receives the encrypted and authenticated key shares from the storage enclaves. The interface device 52 also sends the assembly enclave additional data for carrying out the cryptographic operation, which may include some or all of: details of the mapping from shares to key components; the secret-sharing threshold values; identifiers of the key components to be XOR'd; the associated public key of the key pair; and a transaction identifier. The assembly enclave 59 reconstructs the private signature key, and uses the private key to sign the data (e.g. transaction). It then immediately deletes the private signature key from its memory.

The assembly enclave 59 outputs the signed transaction to the interface device 52, which may send it to the client 51 and/or to other devices (e.g. to a cryptocurrency blockchain) as appropriate.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method for distributed storage of a cryptographic key, the method comprising:

generating a plurality of key components wherein each key component is generated by a different respective computing device or enclave, the key components being respective values suitable for processing in a key-assembly process to generate a cryptographic key having a value that depends on all of the plurality of key components;

processing a first key component of the plurality of key components in a secret-sharing generation process to generate a plurality of shares of the first key component, such that the first key component can be reconstructed, using a corresponding secret-sharing reconstruction process, from any subset of the shares of at least a predetermined threshold size, the threshold being less than the number of shares;

storing a first share of the plurality of shares in a first store; and storing a second share of the plurality of shares in a second store.

2. The method of claim 1, wherein the first share is not stored in the second store, and wherein the second share is not stored in the first store.

3. The method of claim 1, wherein no two shares of the plurality of shares of the first key component are stored in the same store as each other.

4. The method of claim 1, further comprising, for each of one or more key components of the plurality of key components, processing a respective set of shares in a respective secret-sharing reconstruction process to reconstruct the respective key component.

5. The method of claim 1, further comprising processing the plurality of key components in a key-assembly process to generate the cryptographic key.

6. A system for distributed storage of a cryptographic key, the system comprising a key-component generating computer apparatus comprising a plurality of key-component generating devices or enclaves, each configured to:

generate a respective key component of a plurality of key components, the key components being respective values suitable for processing in a key-assembly process to generate a cryptographic key having a value that depends on all of the plurality of key components;

process the respective key component of the plurality of key components in a secret-sharing generation process to generate a plurality of shares of the respective key component, such that the respective key component can be reconstructed, using a corresponding secret-sharing reconstruction process, from any subset of the shares of at least a predetermined threshold size;

output a first share of the plurality of shares for storage in a first store; and output a second share of the plurality of shares for storage in a second store.

7. The system of claim 6, wherein each key-component generating device or enclave is further configured to:

process each further key component of the plurality of key components in a respective secret-sharing generation process, to generate a respective plurality of shares of each further key component; and output each share of the respective plurality of shares for storage.

8. The system of claim 6, wherein each key-component generating device or enclave is configured to use a random number generator to generate the respective key components.

9. The system of claim 6, further comprising a key-assembly computer apparatus configured to:

receive, from the first store, the first share of the first key component;

receive, from the second store, the second share of the first key component;

process a set of shares of the first key component, including at least the first share and the second share, in a secret-sharing reconstruction process to reconstruct the first key component;

receive or reconstruct each further key component of the plurality of key components; and process the plurality of key components in a key-assembly process to generate the cryptographic key.

10. The system of claim 9, wherein the key-assembly computer apparatus is configured to receive a respective set of shares of each of one or more further key components, and to process each received set of shares in a respective secret-sharing reconstruction process to reconstruct the respective further key component.

11. The system of claim 9, wherein the key components all have a common bit-length, equal to a bit-length of the cryptographic key, and wherein the key-assembly process comprises calculating a bit-wise XOR of the plurality of key components.

12. The system of claim 9, wherein the key-assembly computer apparatus is configured to generate the cryptographic key in response to receiving an instruction to perform a cryptographic operation using the cryptographic key, and is further configured to use the cryptographic key to perform the cryptographic operation and to erase the cryptographic key from a memory of the key-assembly computer apparatus in response to finishing the cryptographic operation.

13. The system of claim 6, comprising a network of one or more computing devices, each comprising memory and a processor configured to provide a trusted execution environment (TEE) for securely decrypting and executing software instructions that are stored, encrypted, in an enclave stored in the memory of the computing device, wherein the system is configured to:

generate each of the plurality of key components in a different respective key-component generating device or enclave of the system;

perform a respective secret-sharing generation process on each respective key component, within the respective key-component generating device or enclave; and erase each key component from the respective key-component generating device or enclave in response to finishing performing the secret-sharing generation process on the respective key component.

14. The system of claim 13, comprising a plurality of stores, including said first store and said second store, wherein each store is provided by a different respective storage enclave of the system.

15. The system of claim 13, configured to reconstruct each key component, process the key components in a key-assembly process to generate the cryptographic key, and use the cryptographic key to perform a cryptographic operation, all within a key-assembly enclave of the system.

16. A non-transitory computer-readable medium storing instructions which, when executed on a plurality of key-component generating devices or enclaves of a computing processing system, cause the computing processing system to perform the method of claim 1.

\* \* \* \* \*